US008613991B2

(12) United States Patent
Verboom et al.

(10) Patent No.: US 8,613,991 B2
(45) Date of Patent: Dec. 24, 2013

(54) MULTILAYER TUBE WITH AN ALUMINUM ALLOY CORE TUBE

(75) Inventors: Els Verboom, Puurs (BE); Ria Van Den Broeck, Tienen (BE); Cheng Liu, Velserbroek (NL); Andreas Ten Cate, Amsterdam (NL)

(73) Assignee: Aleris Aluminum Duffel BVBA, Duffel (BE)

( * ) Notice: Subject to any disclaimer, the term of this patent is extended or adjusted under 35 U.S.C. 154(b) by 84 days.

(21) Appl. No.: 13/497,251

(22) PCT Filed: Sep. 29, 2010

(86) PCT No.: PCT/EP2010/064454
§ 371 (c)(1),
(2), (4) Date: Jun. 8, 2012

(87) PCT Pub. No.: WO2011/042339
PCT Pub. Date: Apr. 14, 2011

(65) Prior Publication Data
US 2012/0234427 A1  Sep. 20, 2012

(30) Foreign Application Priority Data
Oct. 8, 2009  (EP) .................................. 09012774

(51) Int. Cl.
*B29D 22/00*  (2006.01)
(52) U.S. Cl.
USPC .......... 428/35.9; 428/36.9; 138/131; 138/143
(58) Field of Classification Search
USPC ........................... 428/35.9, 36.9; 138/131, 143
See application file for complete search history.

(56) References Cited

U.S. PATENT DOCUMENTS

| 8,158,273 B2 * | 4/2012 | Wittebrood .................... 428/654 |
| 8,241,719 B2 * | 8/2012 | Van Den Broeck et al. . 428/35.9 |
| 2010/0086717 A1 | 4/2010 | Van Den Broeck et al. |
| 2012/0234427 A1 * | 9/2012 | Verboom et al. ............... 138/143 |

FOREIGN PATENT DOCUMENTS

| EP | 0637481 A1 | 2/1995 |
| EP | 1386975 A1 | 2/2004 |
| EP | 1484420 A1 | 12/2004 |
| EP | 2130669 A1 | 12/2009 |
| NL | 1003401 C2 | 1/1998 |
| WO | 2008058708 A1 | 5/2008 |

OTHER PUBLICATIONS

Althoff et al., Properties and use of a new aluminum-manganese-silicon alloy, Stn Caplus, vol. 33, No. 6 (Jan. 1, 1979), pp. 589-592 (Abstract in English).
International Search Report from PCT/EP2010/064454 dated Dec. 14, 2010.

\* cited by examiner

*Primary Examiner* — N. Edwards
(74) *Attorney, Agent, or Firm* — Novak Druce Connolly Bove + Quigg, LLP

(57) ABSTRACT

The invention relates to a multilayer tube comprising a metal tube having an inner surface and an outer surface, a first polymeric layer bonded to the outer surface, and preferably a second polymeric layer bonded to the inner surface, and wherein the metal tube is made from an aluminium alloy having, in wt. %: Si 1.5 to 2.45, Fe 0.5 to 1.2, Mn 0.5 to 1.2, Cu 0.3 to 1, Mg 0.04 to 0.3, Ti<0.25, Zn<1.2, and other impurities or incidental elements, each <0.05, total <0.25, and the balance being aluminium.

17 Claims, 1 Drawing Sheet

Strain development during creep test.

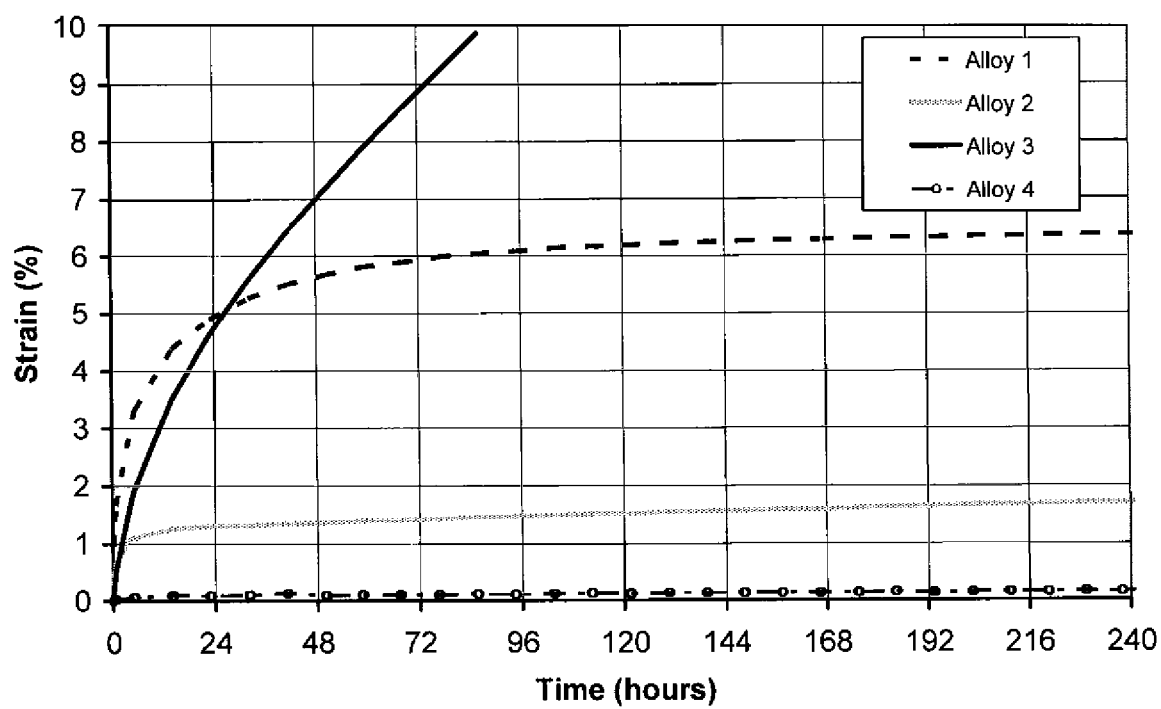
Strain development during creep test.

MULTILAYER TUBE WITH AN ALUMINUM ALLOY CORE TUBE

CROSS-REFERENCE TO RELATED APPLICATIONS

This application is a §371 National Stage Application of International Application No. PCT/EP2010/064454, filed on 29 Sep. 2010, claiming the benefit of European Patent Application No. 09012774.7 filed on 8 Oct. 2009.

FIELD OF THE INVENTION

The invention relates to a multi-layer or multilayer tube comprising an aluminium alloy tube, preferably made from an aluminium alloy sheet bent into the shape of a tube, the tube having an inner surface and an outer surface, a first polymeric layer bonded to the outer surface and optionally a second polymeric layer bonded to the inner surface. Furthermore, the invention is directed to the use of the aluminium alloy in multilayer tubes.

BACKGROUND OF THE INVENTION

As will be appreciated herein below, except as otherwise indicated, alloy designations and temper designations refer to the Aluminum Association designations in Aluminum Standards and Data and the Registration Records, as published by the Aluminum Association in 2009, and are readily familiar and understood to those skilled in the art of aluminium alloys.

For any description of alloy compositions or preferred alloy compositions, all references to percentages are by weight percent unless otherwise indicated.

Multilayer tubes, often abbreviated as MLT, consisting of co-extruded polymeric materials, in particular polyethylene or polypropylene tubes bonded with adhesives to a metal core have found many applications in the building industry, for example as sanitary pipes, heating pipes, gas distribution pipes etc., as well as in other industries such as the pharmaceutical, chemical and food industries. Compared to tubes entirely made from a plastics material, multilayer tubes having an aluminium alloy core layer are impermeable to oxygen and have higher strength and heat resistance, as well as a low expansion coefficient. Such multilayer tubes are flexible and easy to install since they can be bent and cut to the desired length on site. They are also preferred to tubes made of metal only, since the plastic inner and outer layers improve the corrosion resistance and serve as noise barrier. They also save weight and have a better formability.

Such multilayer tubes have an outer polymeric material layer, an inner polymeric material layer and an aluminium core layer in the form of a tube for mechanical strength and long time performance. The inner and outer polymeric material layers are generally bonded to the aluminium core layer by means of an outer and inner adhesive layer, respectively.

One of the most critical properties of multilayer tubes in typical heating and sanitary applications is the resistance to constant and sustained internal pressure at increased temperatures. This is generally tested by the standardized internal pressure tests according to ASTM-F1281, ASTM-F1282 or DVGW-W542 in which the tube is kept at 30 bar and 95° C. until the tube fails. From the time until failure, one may extrapolate the expected lifetime of the tube under the conditions encountered, for example, in the sanitary system of a building, i.e. a temperature of 70° C. at 20 bar. A high resistance against sustained internal pressure is especially important if the metal core layer is to be kept as thin as possible, and for tubes with larger diameters.

Aluminium alloys currently used as core layer in multilayer tubing are AA3003- and AA3005-series aluminium alloys.

The AA3003-series aluminium alloy has a chemical composition, in wt. %, of:

| | |
|---|---|
| Si | <0.6 |
| Fe | <0.7 |
| Cu | 0.05 to 0.20 |
| Mn | 1.0 to 1.5 |
| Zn | <0.10, | impurities <0.05 each, total <0.15, balance aluminum.

This aluminium alloy has previously been used in multilayer tubes because it is relatively inexpensive and has sufficient strength. However, it does not perform well under the sustained pressure tests.

Patent document WO-2008/057608-A1 discloses an aluminium alloy product and a multilayer tube having a tube wall made from said aluminium alloy containing, in wt. %:

| | |
|---|---|
| Si | 0.2 to 1.4 |
| Fe + Mn | 1.1 to 1.8 |
| Cu | 0.15 to 0.5 |
| Mg | <0.20 |
| Ti | <0.20 |
| Zn | <1.5, | and other impurities or incidental elements each <0.05, total <0.2, and the balance being aluminum.

This aluminium alloy has an increased resistance against sustained pressure when tested in the ASTM-F1281 creep test after more than 100 hours at 95° C. and a 30 bar internal pressure in comparison with alloys of the AA3003 and AA8006-series.

A need exists for multilayer tubes with an aluminium alloy core and having further improved creep properties, in particular the resistance to constant and sustained internal pressure, ideally at elevated temperature.

DESCRIPTION OF THE INVENTION

It is an object of the present invention to provide a multilayer tube having an aluminium alloy tube with an inner surface and an outer surface, a first polymeric layer bonded to the outer surface, and having improved creep properties. It is another object to provide a multilayer tube having an aluminium alloy tube with an inner surface and an outer surface, a first polymeric layer bonded to the outer surface, and the aluminium alloy having an improved resistance to sustained internal pressure as compared to conventional aluminium alloys used in multilayer tubes.

These and other objects and further advantages are met or exceeded by the present invention in which there is provided a multilayer tube comprising of a metal tube having an inner surface and an outer surface, a first polymeric layer bonded to the outer surface, and wherein the metal tube is made from an aluminium alloy having, in wt. %:

| | |
|---|---|
| Si | 1.5 to 2.45 |
| Fe | 0.5 to 1.2 |

-continued

| | |
|---|---|
| Mn | 0.5 to 1.2 |
| Cu | 0.3 to 1 |
| Mg | 0.04 to 0.3 |
| Ti | <0.25 |
| Zn | <1.2, | and other impurities or incidental elements, each <0.05, total <0.25, and the balance being aluminum.

This aluminium alloy has demonstrated to have a very good creep resistance, and therefore, the resistance to sustained internal pressure is significantly increased. This improved property renders the aluminium alloy an ideal candidate for application as metal tube in flexible multilayer tubes.

The improved properties are believed to be the resultant of an optimised alloy chemistry, in particular the high Si level in combination with the Cu and Mg additions.

The Si content should be in a range of 1.5% to 2.45%. A more preferred lower limit for the Si content is about 1.7% and more preferably about 1.85%. A too low level of Si has an adverse effect on the hot cracking sensitivity during welding of the aluminium alloy, in particular with the relatively high Fe levels in the aluminium alloy. A too high Si content deteriorates the mechanical properties, in particular the elongation in the O-temper, and the formability of the weld. A more preferred upper-limit is 2.45% and more preferably about 2.25%.

The addition of Cu is an essential alloying element of the present aluminium alloy. The addition of 0.3% of Cu in combination with the addition of Mg has demonstrated to have a significant effect on the creep resistance. The addition of Cu has found to have also a positive effect on the weldability of the aluminium alloy. Preferably the lower limit for the Cu content is 0.4%, and more preferably 0.55%. A too high Cu content has an adverse effect on the mechanical properties and should therefore be limited to 1%, and preferably to about 0.9%. An increased Cu content provides an increased creep resistance, however, a too high Cu content has an adverse effect on the resistance against pitting corrosion.

The addition of some Mg in combination with Cu has demonstrated to have a significant effect on the creep resistance. At least 0.04% of Mg should be added, and more preferably at least 0.05%. The Mg content should be limited to 0.3%, and preferably to about 0.2%.

Preferably the sum of Fe and Mn is also kept relatively high, namely at least 1.4%, but not too high to avoid pre-solidification of coarse particles during casting, so the sum of Fe and Mn should be restricted to 2.3%. Where is tube is made using casting techniques having relatively low cooling rates, for example DC-casting compared to belt casting, it is preferred that the sum of the Fe and Mn content does not exceed 1.95% to avoid to formation of coarse intermetalic compounds. The exact Fe- and Mn-content are tuned based on the formability, corrosion resistance and weldability requirements of the specific application.

Ti can be added to the alloy product amongst others for grain refiner purposes during casting of the alloy stock. The addition of Ti should not exceed about 0.25%. A preferred lower limit for the Ti addition is 0.01%. Ti can be added as a sole element or with either boron or carbon serving as a casting aid for grain size control. Ti may also be added to enhance strength and corrosion resistance, and for that purpose preferably present in an amount of about 0.06% to 0.25%, and more preferably of about 0.07% to 0.18%.

The Zn can be tolerated to a significant level without adversely affecting the improved creep resistance found according to this invention. The present invention specifies an upper limit of 1.2%, preferably about 0.5%, and more preferably about 0.3%.

Zr is preferably not added to the aluminium alloy of the invention, but is present as an unavoidable impurity element at a level of <0.05%, and more preferably <0.02%. Thus, preferably the aluminium alloy may be substantially free from Zr.

Cr is preferably not added to the aluminium alloy of the invention, but is present as an unavoidable impurity element at a level of <0.05%, and more preferably <0.02%. Thus, preferably the aluminium alloy may be substantially free from Cr.

The balance in the aluminium alloy is made by aluminium and normal and/or inevitable incidental elements and impurities. Typically such incidental elements or impurities are present at a level of each <0.05%, total <0.25%.

In a preferred embodiment the metal tube is made from an aluminium alloy consisting of, in wt. %:

| | |
|---|---|
| Si | 1.5 to 2.45%, preferably 1.85 to 2.25%, |
| Fe | 0.5 to 1.2% |
| Mn | 0.5 to 1.2% |
| Cu | 0.3 to 1%, preferably 0.4 to 1%, |
| Mg | 0.04 to 0.3%, preferably 0.05 to 0.2%, |
| Ti | <0.25%, preferably 0.01 to 0.25%, |
| Zn | <1.2%, preferably <0.5%, | and other impurities or incidental elements, each <0.05, total <0.25, and the balance being aluminum.

In a preferred embodiment the multilayer tube comprising of a metal tube having an inner surface and an outer surface, a first polymeric layer bonded to the outer surface and a second polymeric layer bonded to the inner surface.

The first and second polymeric layers are preferably made of polyethylene (PE), polypropylene or cross-linked polyethylene (PEX). Any other commercially available plastics suitable for flexible piping applications may also be used.

The gauge range of the aluminium alloy metal tube is typically in the range of about 0.1 to 1 mm, and preferably in a range of about 0.15 to 0.6 mm, to increase the flexibility of the MLT.

For the purpose of this invention the aluminium alloy metal tube is preferably devoid of any metallic layers, such metallic layer(s) are commonly applied for in amongst others brazing sheet to enhance the corrosion performance by providing sacrificial protection to the core alloy and/or to provide a filler metal, typically an AlSi alloy, for the brazing operation.

The aluminium alloy metal tube is ideally produced as a rolled sheet product which is then bent into the shape of a tube and subsequently welded at the seam. For example the metal tube can be overlap-welded or butt-welded. Welding may be performed using various welding techniques, and include ultrasonic welding, Tungsten Inert Gas ("TIG") welding, and laser welding.

An aluminium alloy tube used according to the invention can be prepared by casting an ingot e.g. by means of DC-casting, EMC-casting, EMS-casting, and slabs or ingots resulting from continuous casting, e.g. belt casters or roll casters may also be used, homogenizing and/or pre-heating the ingot after casting, hot-rolling the ingot, cold-rolling to a final gauge, annealing the cold-rolled product at a temperature of about 250° C. to 550° C., preferably at a temperature of about 300° C. to 400° C.; optionally stretching and/or ageing the final product.

In order to enhance the formability of the aluminium alloy required to shape the sheet product into a tube, it is preferred that the aluminium alloy product has a recrystallised microstructure.

The multilayer tube according to this invention is preferably a sanitary pipe or heating pipe for buildings such as for example domestic houses and office buildings. For such application the multilayer tube can be bent, thus is flexible, and has a length of several meters, for example of about 4 to 50 meters or more in length.

In another aspect of the invention it is directed to the use or a method of use of the aluminium alloy product as presently defined as tube material for a flexible multilayer tube comprising the aluminium alloy as metal tube with an inner surface and an outer surface, a first polymeric layer bonded to the outer surface and preferably a second polymeric layer bonded to the inner surface.

In the following, the invention will be explained by the following, non-limitative example.

EXAMPLE

Four aluminium alloys have been produced and having a chemical composition as listed in Table 1. Alloy no. 1 and 2 represent alloy composition of commercial available aluminium alloys used for multilayer tubes, whereby alloy no. 1 is within AA3003 and alloy no. 2 is within the ranges as disclosed in international patent application WO-2008/057608. Alloy no. 4 is an alloy according to this invention, whereas comparative alloy no. 3 and having no Mg is to illustrate the influence of the addition of Mg in an alloy 4 according to the invention and having purposive additions of Cu and a high Si content.

All aluminium alloys have been processed to achieve optimal mechanical properties and creep behaviour. The processing route included casting, homogenisation/preheat, hot rolling, cold rolling, annealing to O-temper condition. The combined homogenisation and preheat was done for 6 hours at 560° C. followed by 4 hours at 500° C. Hot rolling has been done to a gauge of 3 mm, followed by cold rolling to 0.25 mm gauge. Final annealing has been done for 10 hours at 350° C.

TABLE 1

| | All aluminium alloy compositions are in wt. %, balance is made by aluminium and inevitable impurities. | | | | | |
|---|---|---|---|---|---|---|
| | Alloying element, in wt. %. | | | | | |
| Alloy | Si | Fe | Mn | Cu | Mg | Ti |
| 1 | 0.2 | 0.55 | 1.1 | 0.18 | — | — |
| 2 | 0.35 | 1.3 | 0.4 | 0.25 | 0.08 | 0.1 |
| 3 | 2.0 | 0.9 | 0.85 | 0.6 | — | 0.1 |
| 4 | 2.1 | 0.9 | 0.85 | 0.6 | 0.08 | 0.1 |

The mechanical properties of the annealed alloy products at final gauge are listed in Table 2. The lists of this table show that the yield strength ("YS") of alloy 3 and 4 is about 15 to 25 MPa higher than of the commercial available products as represented by alloy no. 1 and 2. The elongation is slightly lower, but still at a sufficient level for multilayer tubing applications.

Another important property listed in Table 2 is the creep life. The creep life is defined as the expected time need for the aluminium alloy to elongate or to strain by 30% under creep test conditions at elevated temperature. The creep test conditions for this example are exposing the sample to a sustained stress of 85 MPa at a temperature of 95° C. These test conditions simulate typical multilayer tubing application conditions and the outcome is a predictor of expected life time of the tube. A higher creep life provides a longer expected product life time.

From a comparison of alloy no. 3 and 4 it can be seen that the creep life can be increased by about three orders of magnitude by adding a relative small amount of Mg to the alloy composition according to this invention.

This improvement is also illustrated in FIG. 1 showing the strain development during creep testing. After about 72 hours alloy no. 3 has reached a strain of about 9%, whereas alloy no. 4 has reached a strain of only 0.2%.

Alloy no. 4 in comparison with alloy no. 2 offers enhanced creep life performance in combination with increased mechanical properties.

Such high mechanical properties, good formability and high creep life expectation renders the aluminium alloy according to the invention an ideal candidate for application in flexible multilayer tubes.

TABLE 2

| Mechanical properties and creep-life. | | | | |
|---|---|---|---|---|
| | Property | | | |
| Alloy | YS [MPa] | UTS [MPa] | A50 [%] | Creep life [hours] |
| 1 | 50 | 122 | 29 | 1,244 |
| 2 | 52 | 120 | 29 | 26,882 |
| 3 | 67 | 153 | 22 | 397 |
| 4 | 75 | 176 | 23 | 112,082 |

Having now fully described the invention, it will be apparent to one of ordinary skill in the art that many changes and modifications can be made without departing from the spirit or scope of the invention as herein described.

The invention claimed is:

1. A multilayer tube comprising a metal tube having an inner surface and an outer surface, a first polymeric layer bonded to the outer surface, and wherein the metal tube is made from an aluminium alloy having, in wt. %:

| Si | 1.5 to 2.45 |
|---|---|
| Fe | 0.5 to 1.2 |
| Mn | 0.5 to 1.2 |
| Cu | 0.3 to 1 |
| Mg | 0.04 to 0.3 |
| Ti | <0.25 |
| Zn | <1.2, | and other impurities or incidental elements, each <0.05, total <0.25, and the balance being aluminum.

2. A multilayer tube according to claim 1, wherein the metal tube is made from an aluminium alloy having a Si content in the range of 1.7% to 2.45%.

3. A multilayer tube according to claim 1, wherein the metal tube is made from an aluminium alloy having a Mg content in the range 0.05% to 0.2%.

4. A multilayer tube according to claim 1, wherein the metal tube is made from an aluminium alloy having a Cu content in the range of 0.55% to 1%.

5. A multilayer tube according to claim 1, wherein the metal tube is made from an aluminium alloy having a Zn content in a range of at most 0.5%.

6. A multilayer tube according to claim 1, wherein the metal tube is made from an aluminium alloy wherein the sum of the Fe and Mn is in a range of 1.4% to 2.3%.

7. A multilayer tube according to claim 1, wherein the metal tube is made from an aluminium alloy having a Ti content in a range 0.01 to 0.25%, and preferably in a range of 0.07% to 0.25%.

8. A multilayer tube according to claim 1, wherein the metal tube is in the form of rolled product devoid of any metallic layer(s).

9. A multilayer tube according to claim 1, wherein the metal tube is made from an aluminium alloy having a gauge in the range of 0.1 to 1 mm.

10. A sanitary pipe or heating pipe in a building comprising the aluminium alloy product defined in claim 1, in a multilayer tube having the aluminium alloy as metal tube and having an inner surface and an outer surface, and a first polymeric layer bonded to the outer surface.

11. A sanitary pipe or heating pipe in a building comprising the aluminium alloy product defined in claim 1, in a multilayer tube having the aluminium alloy as metal tube and having an inner surface and an outer surface, a first polymeric layer bonded to the outer surface and a second polymeric layer bonded to the inner surface.

12. A multilayer tube according to claim 1, wherein the metal tube further comprises a second polymeric layer bonded to the inner surface.

13. A multilayer tube according to claim 1, wherein the metal tube is made from an aluminium alloy having a Si content in the range of 1.85% to 2.25%.

14. A multilayer tube according to claim 1, wherein the metal tube is made from an aluminium alloy having a Cu content in the range of 0.5% to 0.9%.

15. A multilayer tube according to claim 1, wherein the metal tube is made from an aluminium alloy having a Zn content in a range of at most 0.3%.

16. A multilayer tube according to claim 1, wherein the metal tube is made from an aluminium alloy wherein the sum of the Fe and Mn is in a range of 1.4% to 1.95%.

17. A multilayer tube according to claim 1, wherein the metal tube is made from an aluminium alloy having a gauge in the range of 0.15 to 0.6 mm.

* * * * *